US011491571B2

(12) United States Patent
Takada et al.

(10) Patent No.: US 11,491,571 B2
(45) Date of Patent: *Nov. 8, 2022

(54) ARC WELDING METHOD

(71) Applicant: DAIHEN Corporation, Osaka (JP)

(72) Inventors: Kento Takada, Osaka (JP); Tetsuo Era, Osaka (JP); Shugo Hirota, Osaka (JP); Toshiaki Nakamata, Osaka (JP)

(73) Assignee: DAIHEN Corporation, Osaka (JP)

(*) Notice: Subject to any disclaimer, the term of this patent is extended or adjusted under 35 U.S.C. 154(b) by 232 days.

This patent is subject to a terminal disclaimer.

(21) Appl. No.: 16/573,131

(22) Filed: Sep. 17, 2019

(65) Prior Publication Data
US 2020/0254553 A1    Aug. 13, 2020

(30) Foreign Application Priority Data

Feb. 13, 2019    (JP) .............................. JP2019-023388

(51) Int. Cl.
| | |
|---|---|
| *B23K 9/095* | (2006.01) |
| *B23K 9/12* | (2006.01) |
| *B23K 9/173* | (2006.01) |
| *B23K 9/073* | (2006.01) |
| *B23K 9/09* | (2006.01) |
| *B23K 9/16* | (2006.01) |

(52) U.S. Cl.
CPC .............. *B23K 9/095* (2013.01); *B23K 9/073* (2013.01); *B23K 9/124* (2013.01); *B23K 9/173* (2013.01); *B23K 9/09* (2013.01); *B23K 9/16* (2013.01)

(58) Field of Classification Search
CPC .......... B23K 9/095; B23K 9/124; B23K 9/09; B23K 9/16; B23K 9/0671; B23K 9/073

USPC .................................................... 219/130.21
See application file for complete search history.

(56) References Cited

U.S. PATENT DOCUMENTS

| | | | | |
|---|---|---|---|---|
| 4,441,012 A * | 4/1984 | Risbeck | ................ | B23K 9/124 |
| | | | | 219/130.51 |
| 8,124,913 B2 * | 2/2012 | Artelsmair | ............. | B23K 9/092 |
| | | | | 219/130.21 |

(Continued)

FOREIGN PATENT DOCUMENTS

| | | |
|---|---|---|
| DE | 10 2017 113 620 A1 | 12/2018 |
| EP | 2 455 177 A1 | 5/2012 |

(Continued)

OTHER PUBLICATIONS

Machine English translation of JP-2014034031-A (Year: 2014).*

(Continued)

*Primary Examiner* — Sang Y Paik
*Assistant Examiner* — Erwin J Wunderlich
(74) *Attorney, Agent, or Firm* — Hamre, Schumann, Mueller & Larson, P.C.

(57) ABSTRACT

An arc welding method is described where pulse arc welding is performed with a welding wire being fed in a forward direction during a first period and short-circuit transfer arc welding is performed with the welding wire being fed in the forward direction and a reverse direction during a second period. The arc welding method alternately switches between the first period and the second period, where the switching of the first period to the second period is performed during a peak period of the pulse arc welding.

7 Claims, 3 Drawing Sheets

(56) References Cited

U.S. PATENT DOCUMENTS

| | | | | |
|---|---|---|---|---|
| 8,723,080 B2* | 5/2014 | Kawamoto | ............ | B23K 9/067 |
| | | | | 219/125.1 |
| 8,993,925 B2* | 3/2015 | Fujiwara | .................. | B23K 9/09 |
| | | | | 219/130.33 |
| 8,993,926 B2* | 3/2015 | Fujiwara | .................. | B23K 9/09 |
| | | | | 219/137 R |
| 9,089,920 B2* | 7/2015 | Kazmaier | ................ | B23K 9/09 |
| 9,776,273 B2* | 10/2017 | Fujiwara | ............. | B23K 9/0732 |
| 2012/0074115 A1 | 3/2012 | Kazmaier et al. | | |
| 2014/0360995 A1* | 12/2014 | Murakami | ........... | B23K 9/0953 |
| | | | | 219/130.21 |
| 2019/0176257 A1 | 6/2019 | Furuyama et al. | | |

FOREIGN PATENT DOCUMENTS

| | | | |
|---|---|---|---|
| EP | 3 431 214 A1 | | 1/2019 |
| JP | 2005-313179 A | | 11/2005 |
| JP | 2014034031 A | * | 2/2014 |
| JP | 2014039951 A | * | 3/2014 |
| JP | 2015-205347 A | | 11/2015 |
| WO | 2018/043626 A1 | | 3/2018 |

OTHER PUBLICATIONS

Machine English translation of JP-2014039951-A (Year: 2014).*
Search Report received in the corresponding European Patent application, dated Apr. 2, 2020 (7 pages).

* cited by examiner

ARC WELDING METHOD

FIELD

The present disclosure relates to an arc welding method in which welding is performed by alternately switching between two kinds of periods, i.e., a period for pulse arc welding and a period for short-circuit transfer arc welding.

BACKGROUND

A conventional welding method may include the step of feeding a welding wire and the step of alternately switching between a period in which pulse arc welding is performed and a period in which short-circuit transfer arc welding is performed (see JP-A-2005-313179, for example). The switching frequency of the two periods may be approximately 0.1 to 10 Hz. Such a method can produce scale-like beads with a good appearance. In addition, the method can control heat input to the base material by adjusting the ratio between the pulse arc welding period and the short-circuit transfer arc welding period.

JP-A-2015-205347 discloses another arc welding method in which the welding wire is fed in a forward direction during a pulse arc welding period, while it is fed in the forward and reverse directions alternately during a short-circuit transfer arc welding period. More specifically, the short-circuit transfer arc welding period includes an arc period and a short-circuit period, and the welding wire is fed in the forward direction during the arc period, while being fed in the reverse direction during the short-circuit period. In addition, according to the conventional method, the pulse arc welding is switched to the short-circuit transfer arc welding during a base period that begins after a droplet of molten wire is transferred by the pulse arc welding.

In the conventional techniques noted above, the transfer of droplets is caused to occur by different modes or patterns for the pulse arc welding and the short-circuit transfer arc welding. Accordingly, upon switching between the pulse arc welding and the short-circuit transfer arc welding, spatters may be generated and the welding state may become unstable.

SUMMARY

In view of the above circumstances, the present disclosure aims to provide an arc welding method that facilitates smooth switching between pulse arc welding and short-circuit transfer arc welding.

According to an aspect of the present disclosure, there is provided an arc welding method that includes: performing pulse arc welding with a welding wire being fed in a forward direction during a first period; performing short-circuit transfer arc welding with the welding wire being fed in the forward direction and a reverse direction during a second period; and alternately switching between the first period and the second period. The switching of the first period to the second period is performed during a peak period of the pulse arc welding.

Preferably, the method further includes increasing a feeding speed of the welding wire to a forward-feeding peak value during the peak period of the pulse arc welding.

Preferably, the forward-feeding peak value in a first cycle of the second period is set to be different from the forward-feeding peak value in a subsequent cycle of the second period.

Preferably, the short-circuit transfer arc welding is switched to the pulse arc welding during an arc period of the short-circuit transfer arc welding.

Preferably, the short-circuit transfer arc welding is switched to the pulse arc welding at a timing when arching reoccurs and a welding current is at a relatively low level during the short-circuit transfer arc welding.

Further features and advantages of the present disclosure will become apparent from the following detailed description with reference to the attached drawings.

DRAWINGS

EMBODIMENTS

The following describes embodiments of the present disclosure with reference to the accompanying drawings.

Figure 1:
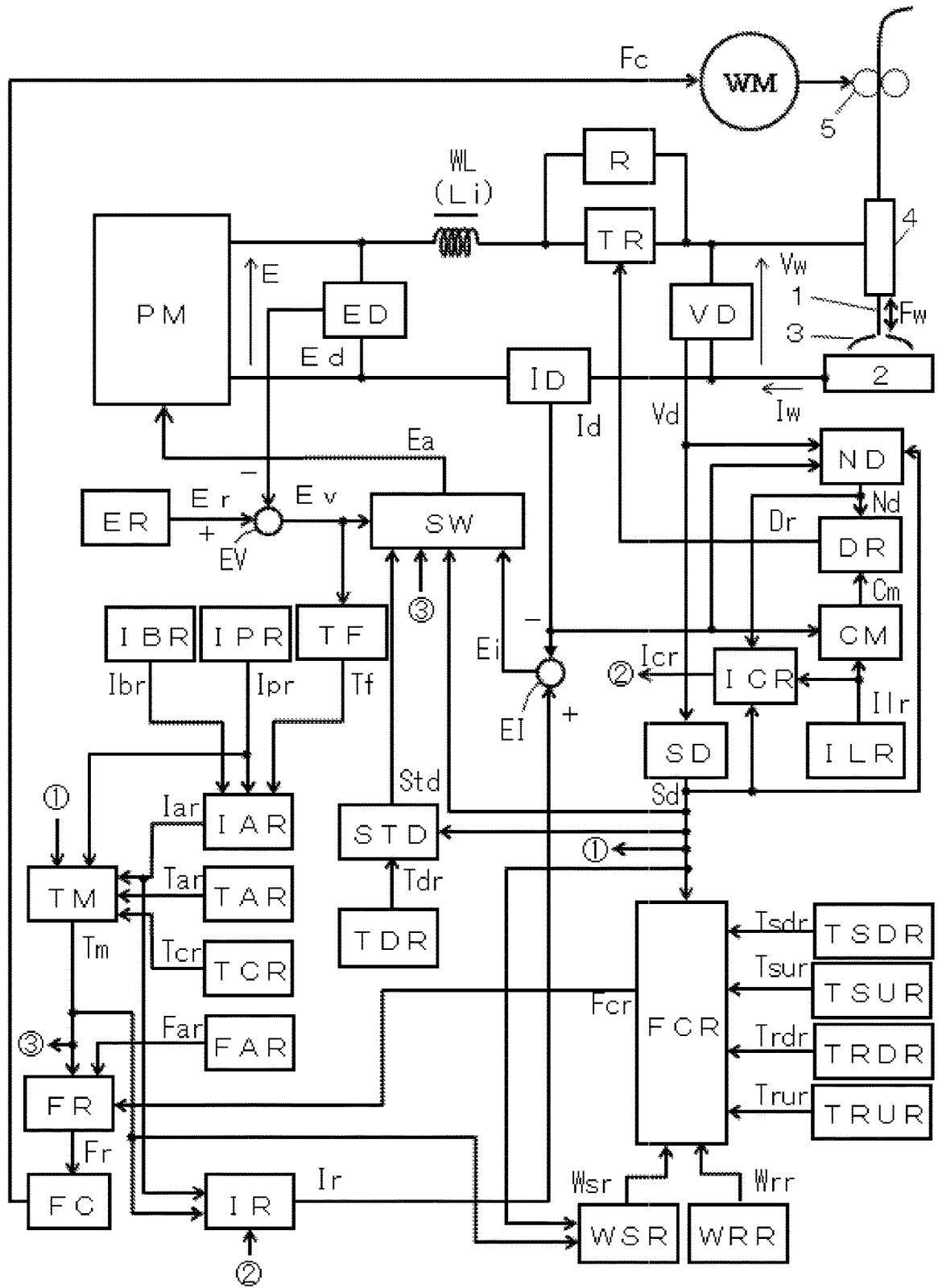
FIG. 1 is a block diagram showing a welding power supply for implementing an arc welding method according to an embodiment of the present disclosure.

FIG. 1 is a block diagram showing a welding power supply for implementing an arc welding method according to an embodiment of the present disclosure. The following describes the blocks illustrated in FIG. 1.

A power main circuit PM may receive a power of three-phase 200 V (or any other suitable voltages) from a commercial power source, and performs output control such as inverter control based on an error amplification signal Ea (described later) so as to output a voltage E. Typically, but without limitation, the power main circuit PM may include a primary rectifier, a smoothing capacitor, an inverter circuit, a high-frequency transformer, and a secondary rectifier. The primary rectifier rectifies alternating current from the commercial power source and outputs the rectified current or direct current (DC). The smoothing capacitor smoothes the direct current from the primary rectifier. The inverter circuit is driven by the error amplification signal Ea and converts the smoothed DC into high-frequency AC. The high-frequency transformer lowers the voltage of the high-frequency AC to a value suitable for welding. The secondary rectifier rectifies the lowered high-frequency AC to DC.

A reactor WL smoothes (e.g., removes undesired ripples from) a welding current Iw so that an arc 3 will be maintained in a stable state.

A feeding motor WM receives a feeding control signal Fc (described later), and feeds a welding wire 1 at feeding speed Fw. The feeding motor WM performs forward feeding during the pulse arc welding period and performs forward and reverse feeding during the short-circuit transfer arc welding period. The feeding motor WM has high transient responsiveness. The feeding motor WM may be provided near the tip of a welding torch 4, in order to improve the rate of change in the feeding speed Fw of the welding wire 1 and to enable quick inversion of the wire feeding direction. In an embodiment, two feeding motors WM may be used to form a push-pull feeding system.

The welding wire 1 is fed through the welding torch 4 by the rotation of a feeding roll 5 connected to the feeding motor WM, and the arc 3 is generated between the tip of the welding wire 1 and a base material 2. Welding voltage Vw is applied between a power supply chip (not shown) within the welding torch 4 and the base material 2 to cause the welding current Iw to flow. A shield gas (not shown) is ejected from the tip of the welding torch 4 to shield the arc 3 from the atmosphere. For the shield gas, a mixed gas of argon gas and carbon dioxide gas may be used when the welding wire 1 is made of steel, while argon gas may be used when the welding wire 1 is made of aluminum.

An output voltage setting circuit ER outputs a predetermined output voltage setting signal Er. An output voltage detection circuit ED detects the output voltage E and smoothes it to output an output voltage detection signal Ed.

A voltage error amplification circuit EV receives the output voltage setting signal Er and the output voltage detection signal Ed, amplifies the error between the output voltage setting signal Er (+) and the output voltage detection signal Ed (−), and outputs a voltage error amplification signal Ev.

A current detection circuit ID detects the welding current Iw and outputs a current detection signal Id. A voltage detection circuit VD detects the welding voltage Vw and outputs a voltage detection signal Vd. A short-circuit determination circuit SD receives the voltage detection signal Vd, and outputs a short-circuit determination signal Sd. Specifically, when the value of the voltage detection signal Vd is less than a predetermined short-circuit determination value (approximately 10 V), the short-circuit determination circuit SD determines that the current period is a short-circuit period, and outputs a short-circuit determination signal Sd of High level. When the value of the voltage detection signal Vd is greater than or equal to the predetermined short-circuit determination value, the short-circuit determination circuit SD determines that the current period is an arc period, and outputs a short-circuit determination signal Sd of Low level.

A forward-feeding acceleration period setting circuit TSUR outputs a predetermined forward-feeding acceleration period setting signal Tsur.

A forward-feeding deceleration period setting circuit TSDR outputs a predetermined forward-feeding deceleration period setting signal Tsdr.

A reverse-feeding acceleration period setting circuit TRUR outputs a predetermined reverse-feeding acceleration period setting signal Trur.

A reverse-feeding deceleration period setting circuit TRDR outputs a predetermined reverse-feeding deceleration period setting signal Trdr.

A forward-feeding peak value setting circuit WSR receives a timer signal Tm (described later) and the short-circuit determination signal Sd, and outputs a forward-feeding peak value setting signal Wsr. The forward-feeding peak value setting signal Wsr may indicate two predetermined values, for example, depending on the situations. Specifically, the forward-feeding peak value setting signal Wsr may indicate: an initial value during a period ("initial value period") from when the timer signal Tm changes to Low level (short-circuit transfer arc welding period Tc) to when the short-circuit determination signal Sd first changes to High level (short-circuit period); and a steady-state value during periods other than the initial value period.

A reverse-feeding peak value setting circuit WRR outputs a predetermined reverse-feeding peak value setting signal Wrr.

A short-circuit arc feeding speed setting circuit FCR receives signals such as the forward-feeding acceleration period setting signal Tsur, the forward-feeding deceleration period setting signal Tsdr, the reverse-feeding acceleration period setting signal Trur, the reverse-feeding deceleration period setting signal Trdr, the forward-feeding peak value setting signal Wsr, the reverse-feeding peak value setting signal Wrr, and the short-circuit determination signal Sd. Based on these signals, the short-circuit arc feeding speed setting circuit FCR outputs a short-circuit arc feeding speed setting signal Fcr having the following feeding speed pattern (1-7). As seen from the below, the short-circuit arc feeding speed setting signal Fcr having a positive value corresponds to a forward-feeding period, whereas the short-circuit arc feeding speed setting signal Fcr having a negative value corresponds to a reverse-feeding period.

Figure 2:
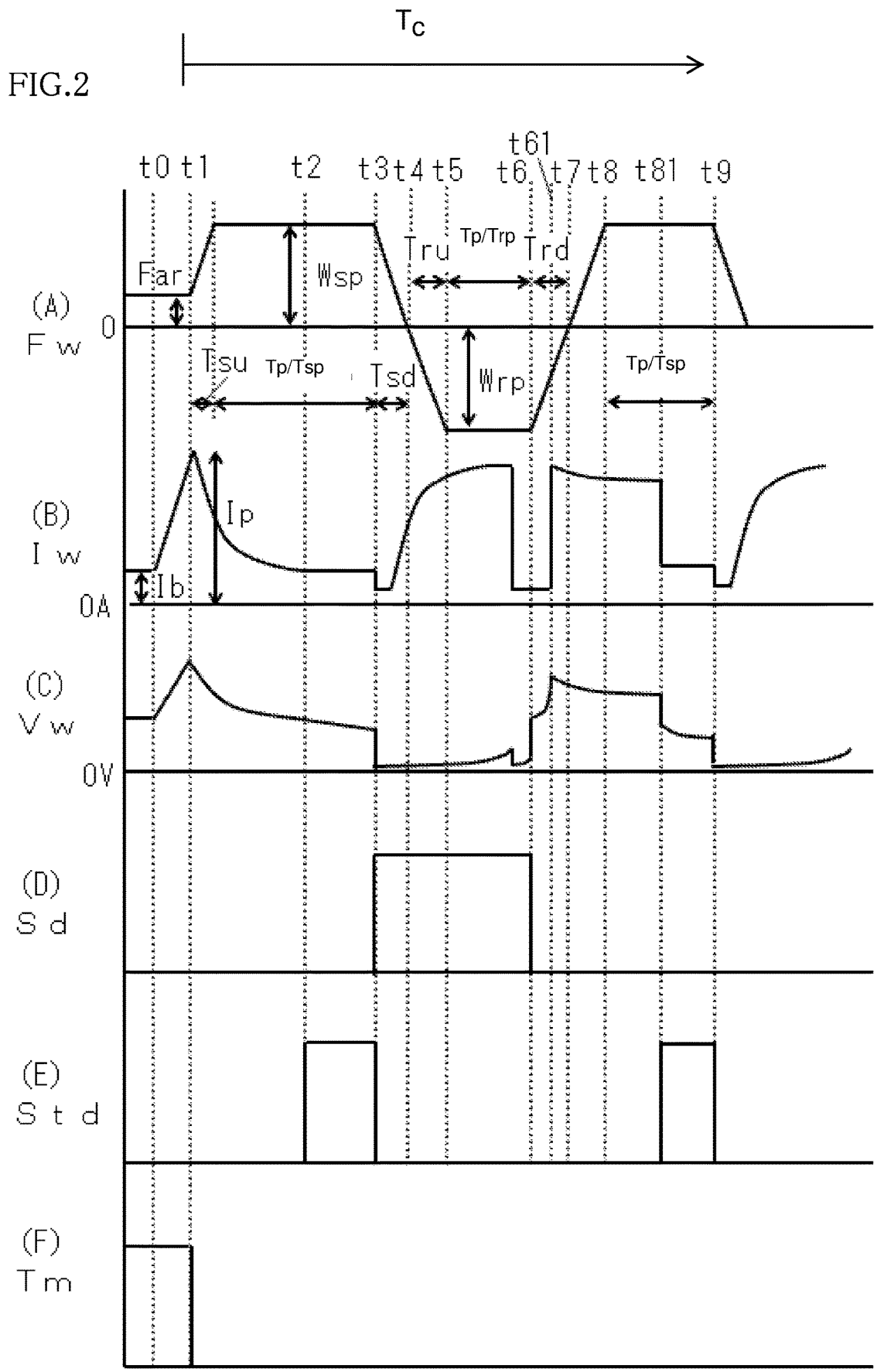
FIG. 2 is a timing chart showing signals for switching from a pulse arc welding period Ta to a short-circuit transfer arc welding period Tc in the welding power supply of FIG. 1.

(1) During a forward-feeding acceleration period Tsu (determined by the forward-feeding acceleration period setting signal Tsur), the short-circuit arc feeding speed setting signal Fcr linearly increases (accelerates) from zero (or from the value of a pulse feeding speed setting signal Far if it is immediately after the period switching to a short-circuit transfer arc welding period Tc has occurred) to a forward-feeding peak value Wsp that is a positive value determined by the forward-feeding peak value setting signal Wsr. Accordingly, as shown in FIG. 2 (A), switching the first period (i.e. the pulse arc welding period Ta) to the second period (i.e. the short-circuit transfer arc welding period Tc) is performed prior to a peak period Wsp of the short-circuit transfer arc welding and also when a welding voltage and a welding current have peak values.

(2) During a forward-feeding peak period Tsp, the short-circuit arc feeding speed setting signal Fcr maintains the forward-feeding peak value Wsp.

(3) During a forward-feeding deceleration period Tsd (determined by the forward-feeding deceleration period setting signal Tsdr), the short-circuit arc feeding speed setting signal Fcr linearly decreases (decelerates) from the forward-feeding peak value Wsp to zero. As seen from FIG. 2, the forward-feeding deceleration period Tsd starts when the short-circuit determination signal Sd changes from Low level (arc period) to High level (short-circuit period).

(4) During a reverse-feeding acceleration period Tru (determined by the reverse-feeding acceleration period setting signal Trur), the short-circuit arc feeding speed setting signal Fcr linearly accelerates from zero to a reverse-feeding peak value Wrp that is a negative value determined by the reverse-feeding peak value setting signal Wrr.

(5) During a reverse-feeding peak period Trp, the short-circuit arc feeding speed setting signal Fcr maintains the reverse-feeding peak value Wrp. Accordingly, as shown in FIG. 2 (A), the second period (i.e. the short-circuit transfer arc welding period Tc) has at least two different periods (Tp/Tsp; Tp/Trp; Tp/Tsp) during which the welding wire is fed at a constant feeding speed. The at least two different periods include a forward-feeding period (Tp/Tsp) and a reverse-feeding period (Tp/Trp), and the constant feeding speed Wsp of the forward-feeding period (Tp/Tsp) is greater than a feeding speed of the welding wire at the time of switching from the first period to the second period.

(6) During a reverse-feeding deceleration period Trd (determined by the reverse-feeding deceleration period setting signal Trdr), the short-circuit arc feeding speed setting signal Fcr linearly decelerates from the reverse-feeding peak value Wrp to zero. As seen from FIG. 2, the reverse-feeding deceleration period Trd stars when the short-circuit determination signal Sd changes from High level (short-circuit period) to Low level (arc period).

(7) The set of the above steps (1) to (6) may be repeated a suitable number of times. Thus, the short-circuit arc feeding speed setting signal Fcr will have a pattern ("feeding pattern") that changes in the form of positive and negative trapezoidal waves.

A current limiting resistor R is provided between the reactor WL and the welding torch 4. The current limiting resistor R may have a value (approximately 0.5 to 3Ω) at least 50 times larger than the resistance value (approximately 0.01 to 0.03Ω) of the conduction path of the welding current Iw during the short-circuit period. When the current limiting resistor R is inserted in the current path of the welding current Iw (as described later), the energy accumulated in the reactor WL and the reactor of the welding cable is consumed rapidly.

A transistor TR is connected in parallel to the current limiting resistor R, and is subjected to ON/OFF control according to a drive signal Dr (described later).

A constriction detection circuit ND receives the short-circuit determination signal Sd, the voltage detection signal Vd, and the current detection signal Id, and outputs a constriction detection signal Nd. When the short-circuit determination signal Sd is at High level (short-circuit period) and the voltage value of the voltage detection signal Vd reaches a reference value, the constriction detection circuit ND determines that the forming state of a constriction in the welding wire has reached a predetermined reference state, and outputs the constriction detection signal Nd at High level. When the short-circuit determination signal Sd changes to Low level (arc period), the constriction detection circuit ND outputs the constriction detection signal Nd at Low level. As another example, when the differential value of the voltage detection signal Vd during the short-circuit period reaches the corresponding reference value, the constriction detection signal Nd may be changed to High level. As yet another example, the resistance value of a droplet may be calculated by dividing the value of the voltage detection signal Vd by the value of the current detection signal Id, and when the differential value of the resistance value reaches the corresponding reference value, the constriction detection signal Nd may be changed to High level.

A low-level current setting circuit ILR outputs a predetermined low-level current setting signal Ilr. A current comparison circuit CM receives the low-level current setting signal Ilr and the current detection signal Id, and outputs a current comparison signal Cm. The current comparison signal Cm is at High level when Id<Ilr, and is at Low level when Id≥Ilr.

A drive circuit DR receives the current comparison signal Cm and the constriction detection signal Nd, and outputs the drive signal Dr to the base of the transistor TR. The drive signal Dr changes to Low level when the constriction detection signal Nd changes to High level, and then changes to High level when the current comparison signal Cm changes to High level. In this manner, the drive signal Dr becomes Low level upon detection of a constriction, thereby causing the transistor TR to be turned off (or placed in OFF state), and thus the current limiting resistor R is inserted in the current path. As a result, the welding current Iw rapidly decreases. When the welding current Iw is reduced to (or lower than) the value of the low-level current setting signal Ilr, the drive signal Dr changes to High level and the transistor TR is turned on (placed in ON state). As a result, the current limiting resistor R is short-circuited, and the normal state is restored.

A short-circuit arc current setting circuit ICR receives the short-circuit determination signal Sd, the low-level current setting signal Ilr, and the constriction detection signal Nd, and performs the following processing to output the following short-circuit arc current setting signal Icr.

(1) When the short-circuit determination signal Sd is at Low level (arc period), the short-circuit arc current setting signal Icr is the low-level current setting signal Ilr. In other words, the low-level current setting signal Ilr is outputted from the circuit ICR as the short-circuit arc current setting signal Icr.

(2) When the short-circuit determination signal Sd changes to High level (short-circuit period), the short-circuit arc current setting signal Icr to be outputted indicates a predetermined initial current setting value during a predetermined initial period, and then (after the initial period) increases from the initial current setting value to a predetermined short-circuit peak setting value with a predetermined short-circuit inclination. The short-circuit arc current setting signal Icr maintains the short-circuit peak setting value for a while.

(3) Thereafter, when the constriction detection signal Nd changes to High level, the short-circuit arc current setting signal Icr indicates the value of the low-level current setting signal Ilr.

A current drop time setting circuit TDR outputs a current drop time setting signal Tdr.

A small-current period circuit STD receives the short-circuit determination signal Sd and the current drop time setting signal Tdr, and outputs a small-current period signal Std. The small-current period signal Std becomes High level when the time determined by the current drop time setting signal Tdr has elapsed from when the short-circuit determination signal Sd changes to Low level (arc period). Thereafter, when the short-circuit determination signal Sd changes to High level (short-circuit period), the small-current period signal Std changes to Low level.

A pulse cycle circuit TF receives the voltage error amplification signal Ev, performs voltage/frequency conversion on the voltage error amplification signal Ev, and outputs a pulse cycle signal Tf that becomes High level for a short period of time for every pulse cycle. The pulse cycle signal Tf determines the repetition cycle of the peak period and the base period of the pulse arc welding.

A peak current setting circuit IPR outputs a predetermined peak current setting signal Ipr. A base current setting circuit IBR outputs a predetermined base current setting signal Ibr.

A pulse current setting circuit IAR receives the pulse cycle signal Tf, the peak current setting signal Ipr, and the base current setting signal Ibr, and performs the following processing to output the following pulse current setting signal Iar.

(1) When the pulse cycle signal Tf changes to High level for a short period of time, the pulse current setting signal Iar rises from the base current setting signal Ibr to the peak current setting signal Ipr during a predetermined peak rise period Tu.

(2) During a predetermined peak period Tp, the pulse current setting signal Iar is the peak current setting signal Ipr.

(3) During a predetermined peak fall period Td, the pulse current setting signal Iar falls from the peak current setting signal Ipr to the base current setting signal Ibr.

(4) During the base period Tb that continues until the pulse cycle signal Tf becomes High level (for a short period of time), the pulse current setting signal Iar is the base current setting signal Ibr.

A pulse arc welding period setting circuit TAR outputs a predetermined pulse arc welding period setting signal Tar. A short-circuit transfer arc welding period setting circuit TCR outputs a predetermined short-circuit transfer arc welding period setting signal Tcr.

A timer circuit TM receives the pulse arc welding period setting signal Tar, the short-circuit transfer arc welding period setting signal Tcr, the short-circuit determination signal Sd, the pulse current setting signal Iar, and the peak current setting signal Ipr. Based on these signals, the time circuit TM outputs a timer signal Tm.

As shown in FIG. 2 (F), the timer signal Tm changes to Low level (see t1) and maintains the Low level (short-circuit transfer arc welding period Tc). Then, a certain time period determined by the short-circuit transfer arc welding period setting signal Tcr will elapse and thereafter the short-circuit determination signal Sd will change to Low level (see signal Sd shown in FIG. 3 (D), in which the signal Sd changes to Low level (arc period) for the first time after the elapse of the time period determined by the signal Tcr). Further, a predetermined delay period elapses after the change of the short-circuit determination signal Sd, and at this point, the timer signal Tm changes to High level (see t1 in FIG. 3) and maintains the High level (pulse arc welding period Ta).

After the timer signal Tm changes to High level (t1 in FIG. 3), a period determined by a pulse arc welding period setting signal Tar will elapse, and the pulse current setting signal Iar becomes equal in value to the peak current setting signal Ipr (i.e., these two signals become equal for the first time after the lapse of the period determined by the setting signal Tar). At this point, the timer signal Tm changes to Low level (see t1 in FIG. 2).

In light of the above, the pulse arc welding period Ta is the sum of the period by the pulse arc welding period setting signal Tar, and the subsequent period which continues until the first peak period begins. The short-circuit transfer arc welding period Tc is the sum of the period by the short-circuit transfer arc welding period setting signal Tcr and the subsequent period which continues until the first delay period ends.

A pulse feeding speed setting circuit FAR outputs a pulse feeding speed setting signal Far having a predetermined positive value.

A feeding speed setting circuit FR receives the timer signal Tm, the short-circuit arc feeding speed setting signal Fcr, and the pulse feeding speed setting signal Far. Then, the feeding speed setting circuit FR outputs the pulse feeding speed setting signal Far as a feeding speed setting signal Fr when the timer signal Tm is at High level (pulse arc welding period Ta), and outputs the short-circuit arc feeding speed setting signal Fcr as the feeding speed setting signal Fr when the timer signal Tm is at Low level (short-circuit transfer arc welding period Tc).

A feeding control circuit FC receives the feeding speed setting signal Fr, and outputs, to the feeding motor WM, the feeding control signal Fc for feeding the welding wire 1 at the feeding speed Fw corresponding to the value indicated by the feeding speed setting signal Fr.

A current setting circuit IR receives the timer signal Tm, the short-circuit arc current setting signal Icr, and the pulse current setting signal Iar. The current setting circuit IR outputs the pulse current setting signal Iar as a current setting signal Ir when the timer signal Tm is at High Level (pulse arc welding period Ta), and outputs the short-circuit arc current setting signal Icr as the current setting signal Ir when the timer signal Tm is at Low level (short-circuit transfer arc welding period Tc).

A current error amplification circuit EI receives the current setting signal Ir and the current detection signal Id, amplifies the error between the current setting signal Ir (+) and the current detection signal Id (−), and outputs a current error amplification signal Ei.

A power characteristic switching circuit SW receives the timer signal Tm, the current error amplification signal Ei, the voltage error amplification signal Ev, the short-circuit determination signal Sd, and the small-current period signal Std. Based on these signals, the power characteristic switching circuit SW performs the following processing to output the following error amplification signal Ea.

(1) During the period from when the short-circuit determination signal Sd changes to High level (short-circuit period) while the timer signal Tm is being at Low level to when the delay period has lapsed after the short-circuit determination signal Sd changes to Low level (arc period), the current error amplification signal Ei is outputted as the error amplification signal Ea.

(2) During a subsequent large-current arc period, the voltage error amplification signal Ev is outputted as the error amplification signal Ea.

(3) During a small-current arc period in which the small-current period signal Std becomes High level during the arc period, the current error amplification signal Ei is outputted as the error amplification signal Ea.

(4) During the period in which the timer signal Tm is at High level, the current error amplification signal Ei is outputted as the error amplification signal Ea.

With the above arrangements, the welding power supply in the short-circuit transfer arc welding period Tc has a constant current characteristic during the short-circuit period, the delay period, and the small-current arc period. On the other hand, the welding power supply has a constant voltage characteristic during the other period, i.e., the large-current arc period (a period while the timer signal Tm is being at Low level, from when the delay time has elapsed after the short-circuit determination signal Sd changes from High level to Low level to when the small-current period signal Std changes from Low level to High level). During the pulse arc welding period Ta, the welding power supply has a constant current characteristic.

FIG. 2 is a timing chart showing several signals for switching from the pulse arc welding period Ta to the short-circuit transfer arc welding period Tc in the welding power supply of FIG. 1. In FIG. 2, (A) shows the change of the feeding speed Fw with time, (B) shows the change of the welding current Iw with time, (C) shows the change of the welding voltage Vw with time, (D) shows the change of the short-circuit determination signal Sd with time, (E) shows the change of the small-current period signal Std with time, and (F) shows the change of the timer signal Tm with time. With reference to FIG. 2 (and FIG. 3 as well), the following describes the operations by the respective signals.

As shown in (B) of FIG. 2, the welding current Iw begins to rise at time t0 from the base current and increases up to the peak current value at time t1. At the same time (i.e., at t1), the timer signal Tm changes from High level to Low level. Specifically, before time t1 (and t0, for that matter), the timer signal Tm may change to High level (see t1 in FIG. 3, at which the pulse arc welding period Ta starts), and then the time determined by the pulse arc welding period setting signal Tar elapses. Thereafter, the pulse current setting signal Iar becomes equal to the peak current setting signal Ipr for the first time. At this timing, as shown in (F) of FIG. 2, the timer signal Tm changes from High level to Low level (see time t1 in FIG. 2). Accordingly, at time t1 (FIG. 2), the pulse arc welding period Ta is changed to the short-circuit transfer arc welding period Tc. As shown in (A) of FIG. 2, forward feeding is performed during the period before time t1 with the feeding speed Fw being a constant speed determined by the pulse feeding speed setting signal Far shown in FIG. 1. As shown in (C) of FIG. 2, the welding voltage Vw increases from the base voltage up to the peak voltage. As shown in (D) of FIG. 2, the short-circuit determination signal Sd remains at Low level because the arc period continues. As shown in (E) of FIG. 2, the small-current period signal Std remains at Low level.

As shown in (F) of FIG. 2, the timer signal Tm changes to Low level at time t1 and the short-circuit transfer arc welding period Tc begins. In response, as shown in (A) of FIG. 2, the feeding speed Fw increases to the forward-feeding peak value Wsp determined by the forward-feeding peak value setting signal Wsr shown in FIG. 1, and maintains the value until short-circuiting occurs at time t3. The forward-feeding peak value Wsp during this period is a predetermined "initial value" because it is within a particular period, i.e., from when the timer signal Tm changes to Low level to when the short-circuit determination signal Sd changes to High level (short-circuit period) for the first time immediately after the changing of the timer signal Tm to Low level. Thereafter, the forward-feeding peak value Wsp may be a predetermined "steady-state" value. Preferably, the initial value is determined independently from the steady-state value so as to stabilize the welding state during this particular period. In an embodiment, however, the initial value may be equal to the steady-state value.

During the period from t1 to t2 (FIG. 2), the welding current Iw will change in response to the variation of the arc load since the welding power source is in the state of the constant voltage characteristic. For instance, the welding current Iw may begin to decrease at time t1. Likewise, as shown in (C) of FIG. 2, the welding voltage Vw may also begin to fall.

At time t2 (FIG. 2), the time of lapse from t1 reaches the value determined by the current drop time setting signal Tdr. Thus, as shown in (E) of FIG. 2, the small-current period signal Std changes from Low level to High level. In response, the mode of the welding power source is switched from the constant voltage characteristic to the constant current characteristic. Hence, as shown in (B) of FIG. 2, the welding current Iw decreases to the low level current value, and maintains that level until short-circuiting occurs at time t3. Likewise, as shown in (C) of FIG. 2, the welding voltage Vw decreases. The small-current period signal Std changes to Low level from High level at time t3, i.e., when short-circuiting occurs.

The feeding speed Fw shown in (A) of FIG. 2 is controlled by the short-circuit arc feeding speed setting signal Fcr outputted from the short-circuit arc feeding speed setting circuit FCR shown in FIG. 1. The feeding speed Fw can be divided into several sections that correspond to: the forward-feeding acceleration period Tsu determined by the forward-feeding acceleration period setting signal Tsur; the forward-feeding peak period Tsp that continues until short-circuiting occurs; the forward-feeding deceleration period Tsd determined by the forward-feeding deceleration period setting signal Tsdr; the reverse-feeding acceleration period Tru determined by the reverse-feeding acceleration period setting signal Trur; the reverse-feeding peak period Trp that continues until arcing occurs; and the reverse-feeding deceleration period Trd determined by the reverse-feeding deceleration period setting signal Trdr. The forward-feeding peak value Wsp is determined by the forward-feeding peak value setting signal Wsr, and the reverse-feeding peak value Wrp is determined by the reverse-feeding peak value setting signal Wrr. The short-circuit arc feeding speed setting signal Fcr has a feeding pattern that changes in the form of positive and negative trapezoidal waves.

Operations in Short-Circuit Period from t3 to t6

When short-circuiting occurs at time t3 in the forward-feeding peak period Tsp, the welding voltage Vw rapidly decreases to a short-circuit voltage value of several volts, as shown in (C) of FIG. 2. This causes the short-circuit determination signal Sd to change to High level (short-circuit period), as shown in (D) of FIG. 2. In response, the feeding speed Fw enters the forward-feeding deceleration period Tsd from time t3 to t4, and decelerates from the forward-feeding peak value Wsp to zero, as shown (A) of FIG. 2. The forward-feeding deceleration period Tsd is set to 1 ms (Tsd=1 ms), for example.

As shown in (A) of FIG. 2, the feeding speed Fw enters the reverse-feeding acceleration period Tru from time t4 to time t5, and accelerates from zero to the reverse-feeding peak value Wrp. The short-circuit period continues during this period Tru. The reverse-feeding acceleration period Tru is set to 1 ms (Tru=1 ms), for example.

When the reverse-feeding acceleration period Tru ends at time t5, the feeding speed Fw enters the reverse-feeding peak period Trp and indicates the reverse-feeding peak value Wrp, as shown in (A) of FIG. 2. The reverse-feeding peak period Trp continues until arcing occurs at time t6. Accordingly, the period from time t3 to time t6 is a short-circuit period. The reverse-feeding peak period Trp may not be specifically set, but may last approximately 4 ms. The reverse-feeding peak value Wrp may be set to −60 m/min (Wrp=−60 m/min), for example.

Referring to (B) of FIG. 2, the welding current Iw may have a predetermined initial current value during a predetermined initial period (or sub-period) in the short-circuit period from time t3 to t6. Then, the welding current Iw may rise with a predetermined short-circuit inclination (in other words, within a short-circuit inclination period) to reach a predetermined short-circuit peak value, and may maintain (or substantially maintain) the short-circuit peak value.

As shown in (C) of FIG. 2, the welding voltage Vw will begin to rise at or around the point when the welding current Iw reaches the short-circuit peak value. This is because a constriction is gradually formed in a droplet at the tip of the welding wire 1 due to the reverse feeding of the welding wire 1 and the action of a pinch force by the welding current Iw.

Then, when the voltage value of the welding voltage Vw reaches the reference value, determination is made that the constriction being formed has reached the reference state, and accordingly the constriction detection signal Nd of FIG. 1 changes to High level.

In response to the state where the constriction detection signal Nd indicates High level, the drive signal Dr of FIG. 1 indicates Low level. This causes the transistor TR of FIG. 1 to be turned off, and the current limiting resistor R of FIG. 1 is inserted in the current path. At the same time, the value of the short-circuit arc current setting signal Icr decreases to the value of the low-level current setting signal Ilr. As a result, the value of the welding current Iw decreases sharply or plummets from the short-circuit peak value to a low-level current value, as shown in (B) of FIG. 2. When the welding current Iw decreases to the low-level current value, the drive signal Dr changes back to High level, thereby causing the transistor TR to be turned on, and hence the current limiting resistor R to be short-circuited. As shown in (B) of FIG. 2, the welding current Iw maintains the low-level current value until a predetermined delay period elapses from the reoccurrence of arcing, for the short-circuit arc current setting signal Icr is still the low-level current setting signal Ilr. Thus, the transistor TR is placed in OFF state only during the period from when the constriction detection signal Nd changes to High level to when the welding current Iw decreases to the low-level current value. As shown in (C) of FIG. 2, the welding voltage Vw decreases once and then rapidly rises due to the decrease in the welding current Iw. The parameters described above may be set to have the following values. Initial current=40 A, Initial period=0.5 ms, Short-circuit inclination=180 A/ms, Short-circuit peak value=400 A, Low-level current value=50 A, and Delay period=0.5 ms.

Operations in Arc Period from t6 to t9

The reverse feeding of the welding wire and the action of the pinch force by the flow of the welding current Iw cause the constriction to progress and generate an arc at time t6, and accordingly the welding voltage Vw rapidly increases to an arc voltage value of several tens of volts, as shown in (C) of FIG. 2. As a result, the short-circuit determination signal Sd changes to Low level (arc period), as shown in (D) of FIG. 2. In response, the feeding speed Fw enters the reverse-feeding deceleration period Trd from time t6 to time t7, and decelerates from the reverse-feeding peak value Wrp to zero, as shown in (A) of FIG. 2.

When the reverse-feeding deceleration period Trd ends at time t7, the feeding speed Fw enters the forward-feeding acceleration period Tsu from time t7 to time t8. During the forward-feeding acceleration period Tsu, the feeding speed Fw accelerates from zero to the forward-feeding peak value Wsp, as shown in (A) of FIG. 2. The arc period continues during this period. The forward-feeding acceleration period Tsu is set to 1 ms (Tsu=1 ms), for example.

When the forward-feeding acceleration period Tsu ends at time t8, the feeding speed Fw enters the forward-feeding peak period Tsp, and indicates the forward-feeding peak value Wsp, as shown in (A) in FIG. 2. The arc period still continues during this period. The forward-feeding peak period Tsp continues until short-circuiting occurs at time t9. Accordingly, the arc period is the period from time t6 to time t9. Then, when short-circuiting occurs, the same operations as those at time t3 onward will be repeated. The forward-feeding peak period Tsp may not be specifically set, but may last approximately 4 ms. The forward-feeding peak value Wsp may be set to 70 m/min (Wsp=70 m/min), for example.

When arcing occurs at time t6, the welding voltage Vw rapidly increases to an arc voltage value of several tens of volts, as shown in (C) of FIG. 2. On the other hand, the welding current Iw maintains the low-level current value during the delay period from time t6 to time t61. After time t61, the welding current Iw rapidly increases to the peak value, and then reaches a large current value that gradually decreases. During the large-current arc period from time t61 to t81, the voltage error amplification signal Ev of FIG. 1 performs feedback control for the welding power supply, so that the welding power supply has a constant voltage characteristic. Accordingly, the value of the welding current Iw during the large-current arc period changes with the arc load.

As shown in (E) of FIG. 2, the small-current period signal Std changes to High level at time t81 when the current drop time determined by the current drop time setting signal Tdr of FIG. 1 elapses from the occurrence of arcing at time t6. In response, the welding power supply is switched to have a constant current characteristic instead of the constant voltage characteristic. As a result, the welding current Iw decreases to the low-level current value, and maintains the value until time t9 at which short-circuiting occurs. Similarly, the welding voltage Vw also decreases as shown in (C) of FIG. 2. The small-current period signal Std changes back to Low level when short-circuiting occurs at time t9.

The short-circuit transfer arc welding period Tc includes a plurality of cycles in which a short-circuit period and an arc period are alternately repeated. One cycle of short-circuiting and arcing lasts approximately 10 ms, for example. The short-circuit transfer arc welding period Tc lasts approximately 50 to 500 ms, for example. The example shown in FIG. 2 illustrates a case where the switching to the short-circuit transfer arc welding period Tc is performed at the start of a peak period. Alternatively, the switching may be performed sometime in the middle of the peak period Tp, or during the peak rise period Tu, or the peak fall period Td.

Figure 3:
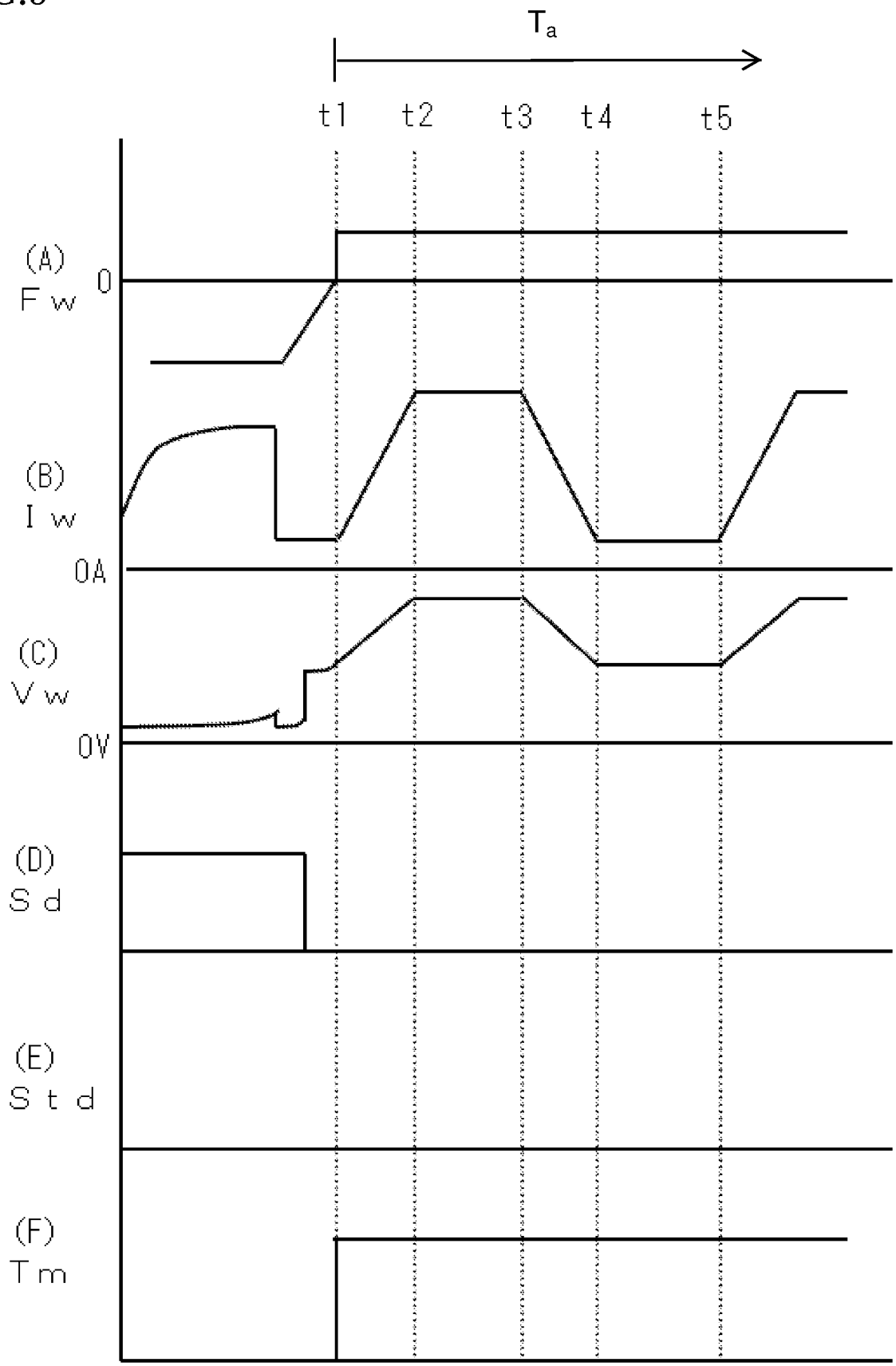
FIG. 3 is a timing chart showing signals for switching from a short-circuit transfer arc welding period Tc to a pulse arc welding period Ta in the welding power supply of FIG. 1.

FIG. 3 is a timing chart showing several signals for switching from the short-circuit transfer arc welding period Tc to the pulse arc welding period Ta in the welding power supply of FIG. 1. In FIG. 3, (A) shows the change of the feeding speed Fw with time, (B) shows the change of the welding current Iw with time, (C) shows the change of the welding voltage Vw with time, (D) shows the change of the short-circuit determination signal Sd with time, (E) shows the change of the small-current period signal Std with time, and (F) shows the change of the timer signal Tm with time. With reference to FIG. 3, the following describes the operations by the respective signals.

At time t1 (and immediately before time t1), the welding current Iw has a low-level current value, as shown in (B) of FIG. 3. This is because the welding current Iw is in a delay period that comes after the end of short-circuiting and reoccurrence of arcing. As shown in (F) of FIG. 3, the timer signal Tm changes from Low level to High level at time t1 since this is the timing at which the predetermined delay period has elapsed, starting from when the short-circuit determination signal Sd changes to Low level (see (D) of FIG. 3) for the first time after the period determined by the short-circuit transfer arc welding period setting signal Tcr (FIG. 1) has elapsed (this period starts from when the timer signal Tm changes to Low level. See t1 in FIG. 2). As a result, the short-circuit transfer arc welding period Tc is switched to the pulse arc welding period Ta at t1 in FIG. 3. As shown in (A) of FIG. 3, before time t1, the feeding speed Fw is in the reverse-feeding deceleration period Trd in which the wire feeding speed decreases from the reverse-feeding peak value Wrp toward zero. As shown in (C) of FIG. 3, the welding voltage Vw has an arc voltage value. As shown in (D) of FIG. 3, the short-circuit determination signal Sd is at Low level during the delay period. As shown in (E) of FIG. 3, the small-current period signal Std remains at Low level.

As shown in (F) of FIG. 3, the timer signal Tm changes to High level at time t1 and the pulse arc welding period Ta begins. In response, as shown in (A) of FIG. 3, forward feeding is performed with the feeding speed Fw being a constant speed determined by the pulse feeding speed setting signal Far shown in FIG. 1.

As shown in (B), during the predetermined peak rise period Tu from time t1 to time t2, a transition current rising to a predetermined peak current value Ip flows. During the predetermined peak period Tp from time t2 to time t3, current of the peak current value Ip flows. During the predetermined peak fall period Td from time t3 to time 4, a transition current falling from the peak current value Ip to the predetermined base current value Ib flows. During the base period Tb from time t4 to time t5, the current having the base current value Ib flows. During the pulse arc welding period Ta, the welding power supply has a constant current characteristic, and hence the welding current Iw is set by the pulse current setting signal Iar shown in FIG. 1. As shown in (C) of FIG. 3, the welding voltage Vw has a waveform similar to the current waveform. The pulse cycle Tf from time t1 to time t5 is subjected to feedback control so that the welding voltage Vw has a desired average value. The current waveform parameter is set such that one droplet is transferred for each pulse cycle Tf. For example, the peak current Ip is set to 500 A, the base current Ib to 60 A, the peak rise period Tu to 1 ms, the peak period Tp to 2 ms, and the peak fall period Td to 1 ms.

The pulse arc welding period Ta includes a plurality of pulse cycles Tf. Each pulse cycle Tf lasts approximately 15 ms, for example. The pulse arc welding period Ta lasts approximately 50 to 500 ms, for example. FIG. 3 shows the case where switching to the pulse arc welding period Ta is performed during the delay period. Alternatively, the pulse arc welding period Ta may begin from the base period Tb. Preferably, a small-current period may be provided before the first peak current Ip flows.

The following explains the advantages of the present embodiment. According to the present embodiment, switching to the short-circuit transfer arc welding period is performed during a peak period in the pulse arc welding. In other words, the switching to the short-circuit transfer arc welding period is performed during the arc period in which a large current flows. Accordingly, a droplet is formed on the welding wire before time t3, i.e., before the first short-circuiting occurs in the short-circuit transfer arc welding period. As a result, the droplet can be smoothly transferred to the molten pool during the short-circuiting period, whereby switching from the pulse arc welding period to the short-circuit transfer arc welding period is properly performed. If otherwise, i.e., short-circuiting occurs with no droplet formed, the non-melted portion of the welding wire will thrust into the molten pool, which makes the welding state unstable and generates large spatters. According to the present embodiment, it is possible to prevent such undesired conditions from occurring.

Furthermore, according to the present embodiment, the feeding speed begins to increase during the peak period of the pulse arc welding toward the peak value, while the switching to the short-circuit transfer arc welding period is performed. In this way, fast forward-feeding can be performed with the forward-feeding peak value, thus preventing the occurrence of the first short-circuiting from taking an unduly long time. In addition, it is possible to prevent the size of the droplet formed on the wire from becoming too large at the timing when the first short-circuiting occurs, which is advantageous to suppressing the occurrence of spatters.

Furthermore, according to the present embodiment, the forward-feeding peak value in the first cycle during the short-circuit transfer arc welding may be different from the forward-feeding peak value in the subsequent cycles. In this way, the forward-feeding peak value before the occurrence of the first short-circuiting can be set to an appropriate value, which is advantageous to optimizing the size of the droplet at the timing when the first short-circuiting occurs, and therefore to preventing more effectively the occurrence of spatters.

Furthermore, as seen from the situations at time t1 of FIG. 3, switching to the pulse arc welding is performed during the arc period of the short-circuit transfer arc welding. If such switching is performed during the short-circuit period, it will render the droplet transfer unstable, and my lead to an unstable welding state and occurrence of large drops of spatter. Switching during the arc period, on the other hand, allows smooth transition to the pulse arc welding.

Furthermore, according to the present embodiment, the switching to the pulse arc welding is performed in a state of low level current value with arcing reoccurring during the short-circuit transfer arc welding. In this way, switching to the pulse arc welding is performed with no droplet being formed, which makes it possible to realize a one pulse cycle-one droplet transfer state from the first pulse cycle. This can further stabilize the welding state.

The invention claimed is:

1. An arc welding method comprising:
performing pulse arc welding with a welding wire being fed in a forward direction during a first period;
performing short-circuit transfer arc welding with the welding wire being fed in the forward direction and a reverse direction during a second period; and
alternately switching between the first period and the second period,
wherein switching the first period to the second period is performed prior to a peak period of the short-circuit transfer arc welding and when a welding voltage and a welding current reach peak values, and the second period has at least two different periods during which the welding wire is fed at a constant feeding speed; the at least two different periods include a forward-feeding period and a reverse-feeding period, and the constant feeding speed of the forward-feeding period is greater than a feeding speed of the welding wire at the time of switching from the first period to the second period.

2. The method according to claim 1, further comprising increasing the feeding speed of the welding wire to a forward-feeding peak value after switching the first period to the second period.

3. The method according to claim 1, wherein the second period has a first cycle with a first forward-feeding peak value and a second cycle with a second forward-feeding peak value, the second cycle is subsequent to the first cycle, and the first forward-feeding peak value differs from the second forward-feeding peak cycle.

4. The method according to claim 1, wherein the short-circuit transfer arc welding is switched to the pulse arc welding at a timing when arcing reoccurs and the welding current is at a low level during the short-circuit transfer arc welding.

5. An arc welding method comprising:
performing pulse arc welding with a welding wire being fed in a forward direction during a first period;
performing short-circuit transfer arc welding with the welding wire being fed in the forward direction and a reverse direction during a second period; and
alternately switching between the first period and the second period,
wherein switching the first period to the second period is performed prior to a peak period of the short-circuit transfer arc welding and when a welding voltage and a welding current reach peak values, the second period has at least two different periods during which the welding wire is fed at a constant feeding speed, and a feeding speed of the welding wire immediately increases at the time of switching from the first period to the second period.

6. The method according to claim 5, wherein the feeding speed of the welding wire immediately increases towards a forwarding-feeding peak value at the time of switching from the first period to the second period.

7. The method according to claim 5, wherein the short-circuit transfer arc welding is switched to the pulse arc welding at a time when arcing reoccurs and the welding current is at a low level during the short-circuit transfer arc welding.

* * * * *